United States Patent
Hung et al.

(10) Patent No.: US 9,225,733 B1
(45) Date of Patent: Dec. 29, 2015

(54) PREVENTING COMPUTER WORMS FROM ATTACKING A PRIVATE COMPUTER NETWORK THROUGH A VIRTUAL PRIVATE NETWORK CONNECTION

(71) Applicant: Trend Micro Incorporated, Tokyo (JP)

(72) Inventors: Chien-Wei Hung, Kaohsiung (TW); Chih-Ko Chung, Taipei (TW); Ping-Cheng Chiu, Taoyuan (TW)

(73) Assignee: Trend Micro Incorporated, Toyko (JP)

( * ) Notice: Subject to any disclaimer, the term of this patent is extended or adjusted under 35 U.S.C. 154(b) by 0 days.

(21) Appl. No.: 14/467,325

(22) Filed: Aug. 25, 2014

(51) Int. Cl.
| | |
|---|---|
| H04L 29/06 | (2006.01) |
| G06F 21/51 | (2013.01) |
| H04W 12/08 | (2009.01) |
| G06F 21/44 | (2013.01) |
| G06F 21/85 | (2013.01) |
| G06F 21/53 | (2013.01) |
| H04W 88/06 | (2009.01) |

(52) U.S. Cl.
CPC ............ *H04L 63/1408* (2013.01); *G06F 21/44* (2013.01); *G06F 21/51* (2013.01); *G06F 21/53* (2013.01); *G06F 21/85* (2013.01); *H04L 63/0272* (2013.01); *H04L 67/42* (2013.01); *H04W 12/08* (2013.01); *H04W 88/06* (2013.01)

(58) Field of Classification Search
CPC ......... G06F 21/51; G06F 21/85; G06F 21/44; G06F 21/53; H04W 12/08; H04W 88/06; H04L 63/0272
See application file for complete search history.

(56) References Cited

U.S. PATENT DOCUMENTS

| | | | | |
|---|---|---|---|---|
| 7,633,909 | B1 * | 12/2009 | Jones et al. ................... | 370/338 |
| 8,464,335 | B1 * | 6/2013 | Sinha et al. .................... | 726/13 |
| 8,856,869 | B1 * | 10/2014 | Brinskelle ......................... | 726/2 |
| 2003/0110268 | A1 * | 6/2003 | Kermarec et al. ............. | 709/227 |
| 2010/0125902 | A1 * | 5/2010 | Killian et al. ................... | 726/15 |
| 2012/0002815 | A1 * | 1/2012 | Wei et al. ...................... | 380/270 |

FOREIGN PATENT DOCUMENTS

| | | |
|---|---|---|
| EP | 1 885 082 A1 | 2/2008 |
| EP | 2 439 673 A2 | 4/2012 |

OTHER PUBLICATIONS

Understanding VPDN—Cisco, 5 sheets [retrieved on Jul. 22, 2014], retrieved from the internet: http://www.cisco.com/c/en/us/support/docs/dial-access/virtual-private-dialup-network-vpdn/20980-vpdn-20980.html.

* cited by examiner

*Primary Examiner* — Mohammad A Siddiqi
(74) *Attorney, Agent, or Firm* — Okamoto & Benedicto LLP

(57) ABSTRACT

A system for preventing a computer worm from attacking a private computer network through a virtual private network (VPN) connection includes a client computer and a VPN server. The client computer detects connection attempts to the VPN server. The client computer consults application rules to determine whether an application program running in the client computer and connecting to the VPN server is specifically authorized to connect to the VPN server. The client computer can receive the application rule automatically from the VPN server or manually from a user.

13 Claims, 4 Drawing Sheets

PREVENTING COMPUTER WORMS FROM ATTACKING A PRIVATE COMPUTER NETWORK THROUGH A VIRTUAL PRIVATE NETWORK CONNECTION

BACKGROUND OF THE INVENTION

1. Field of the Invention

The present invention relates generally to computer security.

2. Description of the Background Art

A virtual private network (VPN) allows a private computer network to be accessed over a public computer network, such as the Internet. In practice, a local area network (LAN) of an organization (e.g., company, government, or private individual) may include a VPN server that is connected to the Internet. A user that is a member of the organization may employ a client computer to connect to the VPN server from outside the LAN. For example, the client computer may log onto the VPN server by way of a publicly accessible hotspot, such as those provided by a coffee shop, airport terminals, and other public establishments. The client computer may also log onto the VPN server from a separate private computer network, such as the user's home network. In any case, the client computer connects to the VPN server over the Internet. Connection between the client computer and the VPN server may be encrypted for security. Once authenticated, the VPN server allows the client computer to access computers and other resources on the LAN as if the client computer is locally connected to the LAN.

SUMMARY

In one embodiment, a system for preventing a computer worm from attacking a private computer network through a virtual private network (VPN) connection includes a client computer and a VPN server. The client computer detects connection attempts to the VPN server. The client computer consults application rules to determine whether an application program running in the client computer and connecting to the VPN server is specifically authorized to connect to the VPN server. The client computer can receive the application rule automatically from the VPN server or manually from a user.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
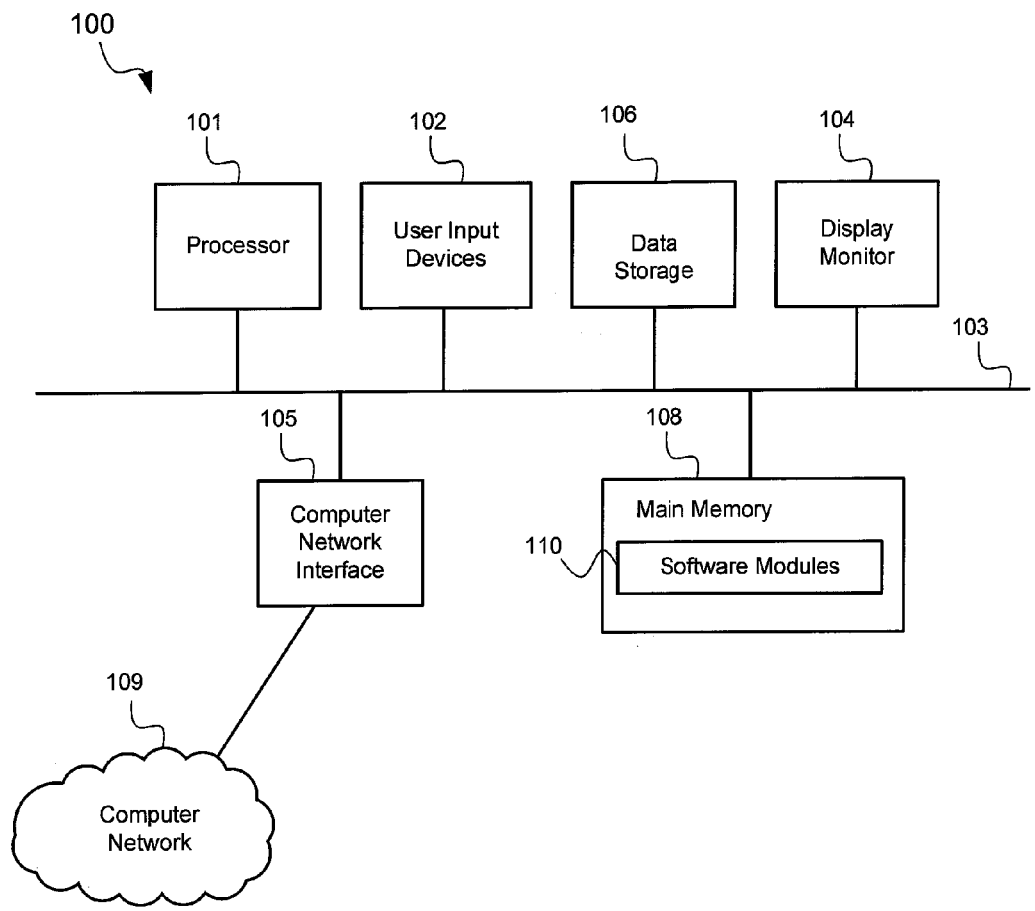
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a client computer, VPN server, and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise an application controller when the computer 100 is employed as a client computer that connects to a private computer network by way of a VPN server. As another example, the software modules 110 may comprise a policy controller when the computer 100 is employed as a VPN server.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
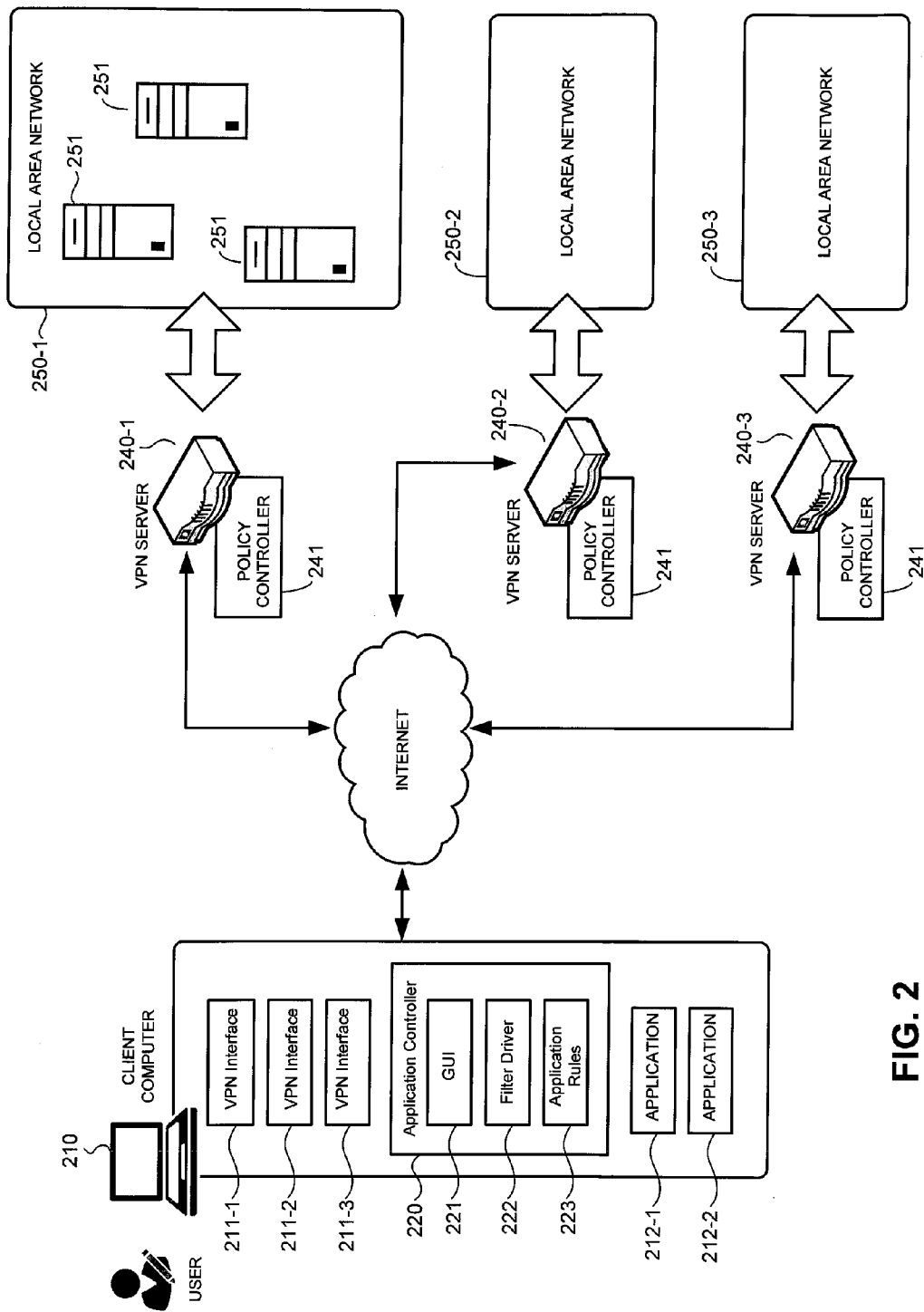
FIG. 2 shows a system for preventing computer worms from attacking a private computer network by way of a VPN connection in accordance with an embodiment of the present invention.

FIG. 2 shows a system for preventing computer worms from attacking a private computer network by way of a VPN connection in accordance with an embodiment of the present invention. A computer worm is a type of malicious code that can replicate itself to spread to other computers. Unlike other malicious code, such as a computer virus, a computer worm does not necessarily have to attach itself to another program. Examples of notoriously well-known computer worms include the so-called "stuxnet" and "flame" worms.

Private computer networks that allow connection by VPN are especially vulnerable to computer worms. Once a client computer is authenticated to connect to the private computer network through a VPN connection, the client computer is essentially in the private computer network and may operate as if the client computer is directly/locally connected to the private computer network. More specifically, the client computer may communicate over the private computer network through the VPN connection. Accordingly, if the client computer is infected with a computer worm, the computer worm can propagate to other computers on the private computer network. The computer worm can perform all sorts of malicious actions including spoofing communications to download malicious code to other computers on the private computer network. Worse, it is relatively difficult for the administrator of the private computer network to remove the computer worm from the client computer or to perform other actions directly against the computer worm because the client computer is in a different domain. As will be more apparent below, the system of FIG. 2 advantageously includes countermeasures that prevent computer worms from attacking the private computer network, which in the example of FIG. 2 is a local area network (LAN), through a VPN connection.

In the example of FIG. 2, the system for preventing computer worms from attacking a private computer network comprises one or more client computers 210 and one or more VPN servers 240 (i.e., 240-1, 240-2, 240-3, etc.). There may be a plurality of client computers 210 that connects to a VPN server 240, but only one is shown for clarity of illustration. A VPN server 240 may comprise a computer that provides a VPN connection to a LAN 250. A VPN server 240 may comprise a commercially-available VPN server.

In the example of FIG. 2, a VPN server 240 may optionally include a policy controller 241. In one embodiment, the policy controller 241 comprises computer-readable program code that authenticates an application controller 220, provides policy rules to the application controller 220, and checks to ensure that the application controller 220 is present and running on a client computer 210 before allowing the client computer 210 to connect to the VPN server 240. The policy controller 241 is further discussed below with reference to FIG. 3.

In the example of FIG. 2, a LAN 250 (i.e., 250-1, 250-2, 250-3, etc.) is a private computer network that includes a plurality of computers 251. A LAN 250 includes a corresponding VPN server 240 that provides a VPN connection for connecting to the LAN 250 over the Internet. For example, the LAN 250-1 includes a VPN server 240-1 that provides a VPN connection for connecting to the LAN 250-1 over the Internet, the LAN 250-2 includes a VPN server 240-2 that provides a VPN connection for connecting to the LAN 250-2 over the Internet, etc.

A client computer 210 may connect to a VPN server 240 over the Internet. For example, the client computer 210 may connect to the Internet by way of a publicly-accessible hotspot to connect to the VPN server 240-1 over the Internet. The VPN server 240-1 authenticates the client computer 210, such as by examining user credentials (e.g., username and password) provided by the client computer 210 to the VPN server 240-1 as part of a logon process. Once authenticated, a VPN connection is established between the client computer 210 and the VPN server 240-1 over the Internet. The VPN connection may be by virtual tunneling protocol or other ways of connecting to a VPN without detracting from the merits of the present invention. The client computer 210 communicates over the LAN 250-1 by way of the VPN connection over the Internet to the VPN server 240-1. The client computer 210 may connect to other LAN 250 the same way by connection to a corresponding VPN server 240.

In the example of FIG. 2, a client computer 210 includes one or more VPN interfaces 211 (i.e., 211-1, 211-2, 211-3, etc.), one or more application programs 212 (i.e., 212-1, 212-2, etc.), and an application controller 220. The client computer 210 connects to a VPN server 240 by using the corresponding VPN interface 211 for that VPN server 240. For example, the client computer 210 may connect to the VPN server 240-1 using the VPN interface 211-1, the client computer 210 may connect to the VPN server 240-2 using the VPN interface 211-2, etc.

A VPN interface 211 may comprise hardware and/or software components for communicating with a particular VPN server 240. All VPN interfaces 211 may use the same computer network interface (e.g., network card) to communicate over the Internet to any VPN server 240. However, each VPN interface 211 may identify a particular VPN server 240 by including data that are specific for that VPN server 240. For example, the VPN interface 211-1 may include the address of the VPN server 240-1 (e.g., IP (Internet Protocol) address, range of IP addresses, or Fully Qualified Domain Name (FQDN)), the authentication credentials for the VPN server 240-1 (e.g., username and password), and connection type to the VPN server 240-1 (e.g., Layer 2 Tunneling Protocol (L2TP) or Point-to-Point Tunneling Protocol (PPTP)). The data included in a VPN interface 211 varies depending on the particulars of the client computer 210, such as the operating system of the client computer 210.

An application program 212 may connect to a particular LAN 250 by connecting to the corresponding VPN server 240 using the VPN interface 211 for that VPN server 240. For example, the application program 212-2 may connect to the LAN 250-3 using the VPN interface 211-3, which in this example includes the particulars of the VPN server 240-3 (i.e., address of the VPN server 240-3 etc.). As another example, the application program 212-2 may connect to the LAN 250-1 using the VPN interface 211-1 for connecting to the VPN server 240-1.

It is to be noted that an application program 212 may or may not be malicious. For example, an application program 212 may be a computer worm or a legitimate (i.e., non-malicious) program. The client computer 210 may further include an application controller 220 for preventing an application program 212 from attacking a local area network through a VPN connection in the event that the application program 212 is a malicious program, such as a computer worm. The application controller 220 may be implemented as computer-readable program code.

In the example of FIG. 2, the application controller 220 includes a graphical user interface (GUI) 221 and a filter driver 222. The GUI 221 provides a user interface that allows a user to enter one or more application rules 223, start or shutdown an application controller 220, and/or initiate downloading of application rules 223 from a VPN server 240 (if the VPN server 240 is configured to do so) or from another computer.

An application rule 223 may indicate specifically which application program 212 can access which VPN server 240. For example, an application rule 223 may indicate that only the application program 212-1 is authorized to connect to the VPN server 240-1; all other application programs not specifically authorized in an application rule 223 are blocked. As another example, an application rule 223 may indicate that only the application programs 212-1 and 212-2 are authorized to connect to the VPN server 240-3; all other application programs not specifically authorized in an application rule 223 are blocked. A VPN server 240 may be identified in an application rule 223 by the VPN server's IP address, range of IP addresses, or FQDN, for example. An application program may be identified in an application rule 223 by the application program's name or digital signature. As an example, the application rule 223 may specify that only application programs 212 signed by a particular security vendor, e.g., TREND MICRO, INC., can access a VPN server 240 within a range of destination IP addresses. The application rules 223 may be received from a policy controller 241 of a VPN server 240. The application rules 223 may be a file that is separate from that of the application controller 220, for example.

The application rules 223 may also be manually entered by a user of the client computer 210 or received from another computer. In one embodiment, if there is a conflict between an application rule 223 received from a policy controller 241 of a VPN server 240 and an application rule 223 that was manually added by a user of the client computer 210, the application rule 223 received from the policy controller 241 supersedes the application rule 223 added by the user. For example, the application rules 223 received from a policy controller 241 of a VPN server 240-1 may specify that only application program 212-1 can access LAN 250-1 and other application programs should be blocked. In that example, even if a user adds an application rule 223 that allows all application programs 212 on the client computer 210 to connect to the LAN 250-1 through VPN server 240-1, only the application program 212-1 can connect to the LAN 250-1; other application programs will be blocked because of the precedence of the applications rules 223 received from the policy controller 241 of the VPN server 240-1.

The filter driver 222 may intercept a communication from an application program 212 to a VPN server 240, consult the application rules 223 to determine if the application program 212 is authorized to connect to the VPN server 240, allow the communication when the application program 212 is authorized to connect to the VPN server 240, and block the communication when the application program 212 is not authorized to connect to the VPN server 240. As a particular example using the MICROSOFT WINDOWS operating system, the filter driver 222 may intercept and hold an attempt by the application program 212 to connect to the VPN server 240 by registering callouts at difference layers, such as FWPM_LAYER_ALE_AUTH_CONNECT_V4, FWPM_LAYER_ALE AUTH_CONNECT_V6, FWPM_LAYER_IPFORWARD_V4, and FWPM_LAYER_IPFORWARD_V6 layers using the WINDOWS Filtering Platform (WFP). WFP is a set of API and system services that not only provides a way to get connection information, such as IP addresses, ports, process ID, and process path, but also provides ways for filter drivers to allow or block the connection at any time.

The filter driver 222 may determine the identity of the application program 212 by checking its process name or digital signature, and then check the application rules 223 to determine if the application program 212 is authorized to connect to the VPN server 240. If not, the filter driver 222 blocks all communications (including the connection attempt) from the application program 212 to the VPN server 240. Otherwise, if the application program 212 is authorized in to connect to the VPN server 240, the filter driver 222 allows the application program 212 to connect to the VPN server 240.

Figure 3:
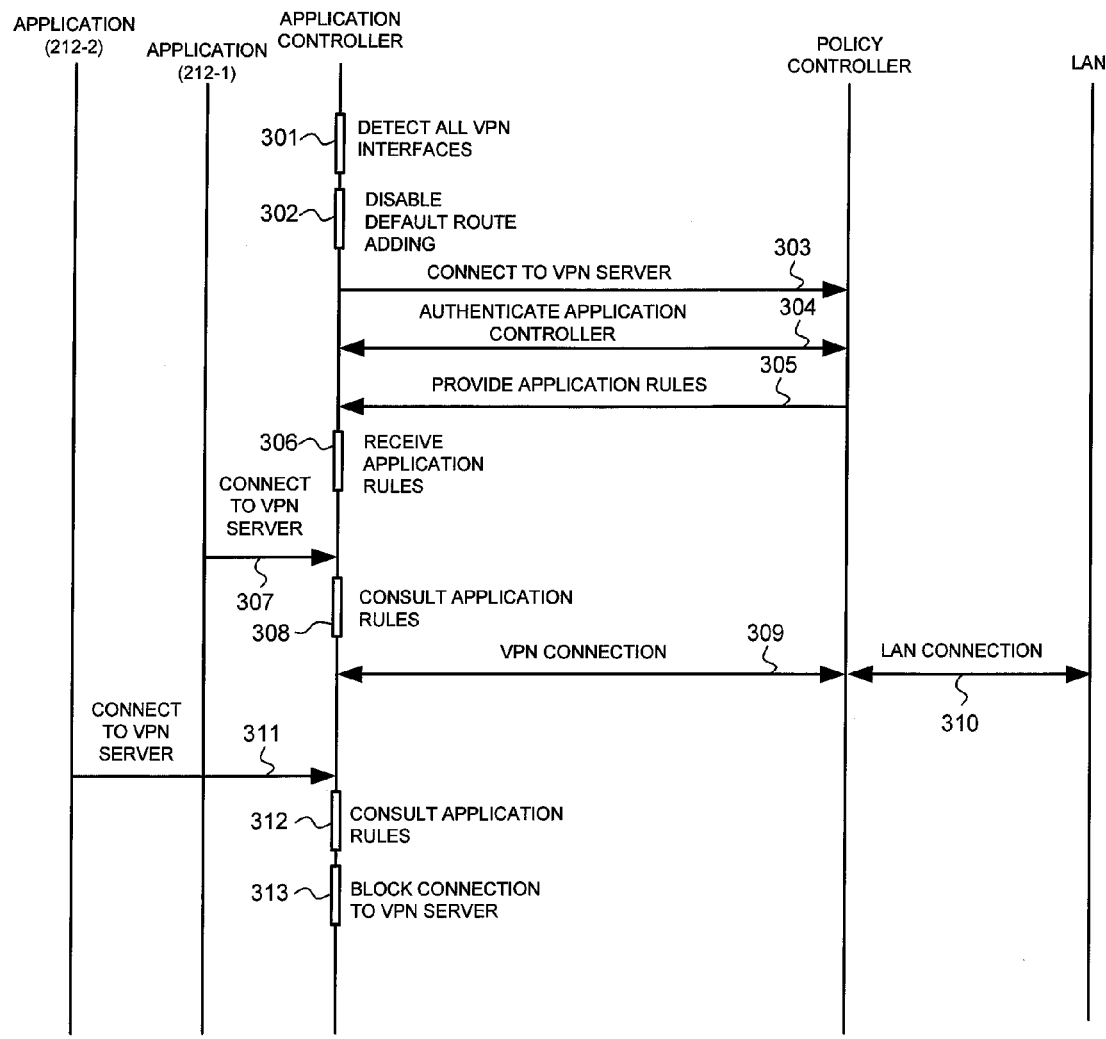
FIG. 3 shows a call diagram of a method of preventing a computer worm from attacking a private computer network through a VPN connection in accordance with an embodiment of the present invention.

FIG. 3 shows a call diagram of a method of preventing a computer worm from attacking a private computer network through a VPN connection in accordance with an embodiment of the present invention. FIG. 3 is for an embodiment where the VPN server 240 includes the optional policy controller 241. In other embodiments, such as in the example of FIG. 4, the VPN server 240 does not include the optional policy controller 241.

In the example of FIG. 3, the application controller 220 automatically detects all VPN interfaces 211 in the client computer 210 (step 301). As explained, each VPN interface 211 is used to connect to a particular VPN server 240. For each identified VPN interface 211, the application controller 220 disables default route adding (step 302). Generally speaking, default route adding allows addition of a route (e.g., another IP address not included in the VPN interface's IP address ranges) to the VPN interface 211 so that all connections may go through the VPN interface 211 and connect to the VPN server 240 by default. Here, default route adding is disabled by the application controller 220 so that a particular VPN interface 211 is used only when the destination IP address of a communication is in the IP address range of the VPN server 240.

The application controller 220 connects to a VPN server 240 using a corresponding identified VPN interface 211 (step 303). In the VPN server 240, the policy controller 241 authenticates the application controller 220 (step 304). For example, the policy controller 241 may authenticate a user name and a password indicated in the VPN interface 211 and provided to the VPN server 240. This allows the policy controller 241 to ensure that an application controller 220 is present and operating on the client computer 210. The application controller 220 may also send a separate validation password to the policy controller 241 to identify the application controller 220 as a valid application controller, e.g., from the same computer security vendor that provides the application controller 220 and the policy controller 241. When the application controller 220 is authenticated to be a valid application controller, the policy controller 241 may provide an application rule 223 to the application controller 220 (step 305). The application rule 223 may indicate one or more application programs 212 that are authorized to connect to the VPN server 240. The application controller 220 receives the application rule 223 and automatically (i.e., without user intervention) adds it to existing application rules 223 (step 306). A newly received application rule 223 may update or overwrite an older application rule 223 that govern access to the VPN server 240. The just described steps (i.e., steps 303-306) may be performed for each identified VPN interface 211.

Subsequently, the application program 212-1 attempts to connect to the VPN server 240 using a corresponding VPN interface 211 (step 307). The application controller 220 intercepts and holds the connection attempt to allow the application controller 220 to first consult the application rules 223 to determine whether or not the application program 212-1 is authorized to connect to the VPN server 240 identified by the VPN interface 211 (step 308).

In this example, the application rule 223 for the VPN server 240 indicates that the application program 212-1 is authorized to connect to the VPN server 240. Accordingly, the application controller 220 allows the application program 212-1 to connect to the VPN server 240 (step 309), which allows the application program 212-1 to connect to the corresponding LAN 250 (step 310). That is, the application controller 220 allows the application program 212-1 to communicate over the LAN 250 through a VPN connection provided by the VPN server 240. Otherwise, if the application program 212-1 is not indicated in any application rule 223 as being authorized to connect to the VPN server 240, the application controller 220 would block all communications from the application program 212-1 to the VPN server 240.

In the example of FIG. 3, the application program 212-2 is also trying to access the LAN 250 by way of a VPN connection through the VPN server 240. More particularly, the application program 212-2 attempts to connect to the VPN server 240 using the corresponding VPN interface 211 (step 311). The application controller 220 intercepts and holds the connection attempt to allow the application controller 220 to first consult the application rules 223 to determine whether or not the application program 212-2 is authorized to connect to the VPN server 240 identified by the VPN interface 211 (step 312). In this example, the application rule 223 for the VPN server 240 does not indicate the application program 212-2 as being authorized to connect to the VPN server 240. That is, the application program 212-2 is not specifically authorized to access the VPN server 240. Accordingly, the application controller 220 blocks all communications (including the connection attempt) from the application program 212-2 to the VPN server 240 (step 313).

As can be appreciated, when a computer worm in a client computer 210 attempts to communicate over a LAN 250 by way of a VPN connection through a VPN server 240, the application controller 220 will detect and intercept the communication attempt. Because the computer worm will not be a program that is specifically authorized in an application rule 223 to connect to the VPN server 240, the application controller 220 will block all communications from the computer worm to the VPN server 240. This advantageously prevents the computer worm from attacking the LAN 250 through a VPN connection, such as the case when the application program 212-2 in the example of FIG. 3 turns out to be a computer worm.

Figure 4:
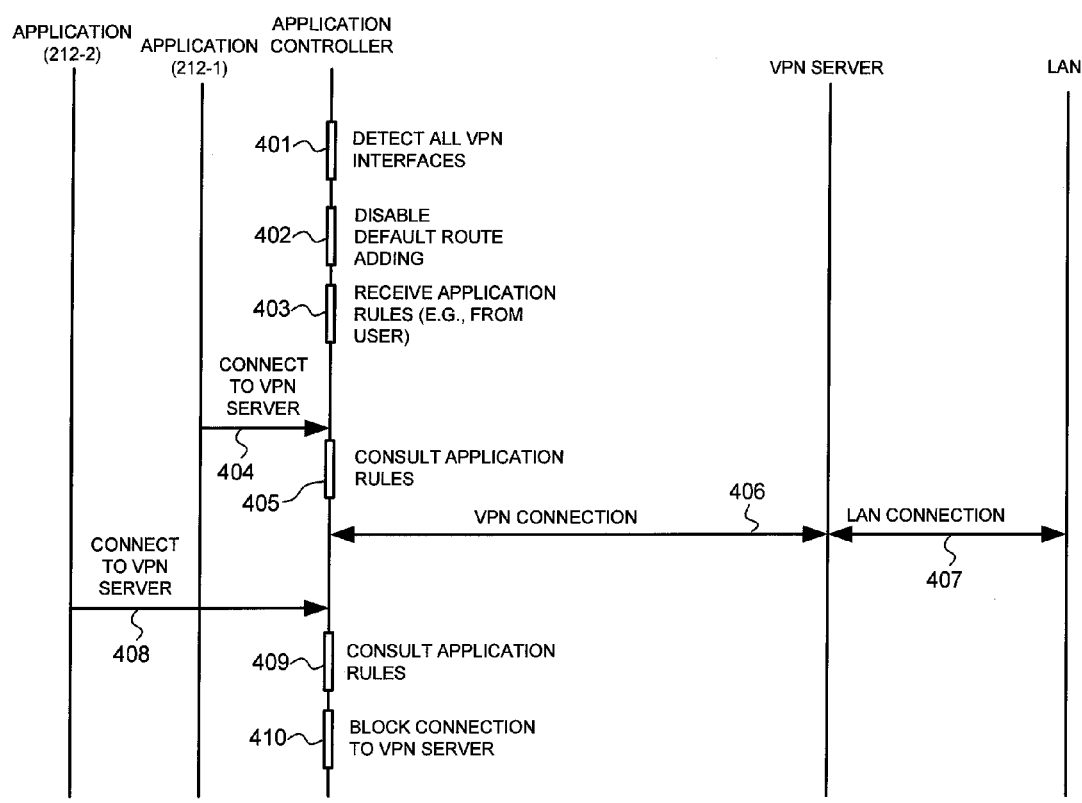
FIG. 4 shows a call diagram of a method of preventing a computer worm from attacking a private computer network through a VPN connection in accordance with another embodiment of the present invention.

Referring now to FIG. 4, there is shown a call diagram of a method of preventing a computer worm from attacking a private computer network through a VPN connection in accordance with another embodiment of the present invention. FIG. 4 is for an embodiment where the VPN server 240 does not include the optional policy controller 241.

In the example of FIG. 4, as before, the application controller 220 automatically detects all VPN interfaces 211 in the client computer 210 (step 401). The application controller 220 disables default route adding for all identified VPN interfaces 211 (step 402). The application controller 220 receives application rules 223 (step 403). In this example, the user may manually enter the application rules 223 using the GUI 221. The application rules 223 may also be received from another computer other than the VPN server 240, such as a support server computer that provides updates to the client computer 210.

Subsequently, the application program 212-1 attempts to connect to the VPN server 240 using a corresponding VPN interface 211 (step 404). The application controller 220 intercepts and holds the connection attempt to allow the application controller 220 to first consult the application rules 223 to determine whether or not the application program 212-1 is authorized to connect to the VPN server 240 identified by the VPN interface 211 (step 404). The application program 212-1 is authorized to connect to the VPN server 240 in the example of FIG. 4. Accordingly, the application controller 220 allows the application program 212-1 to connect to the VPN server 240 (step 406), which allows the application program 212-1 to connect to the corresponding LAN 250 (step 407). This allows the application program 212-1 to communicate over the LAN 250 through a VPN connection provided by the VPN server 240.

In the example of FIG. 4, the application program 212-2 is also trying to access the LAN 250 by way of a VPN connection through the VPN server 240. The application program 212-2 thus attempts to connect to the VPN server 240 using the corresponding VPN interface 211 (step 408). The application controller 220 intercepts and holds the connection attempt to allow the application controller 220 to first consult the application rules 223 to determine whether or not the application program 212-2 is authorized to connect to the VPN server 240 identified by the VPN interface 211 (step 409). In the example of FIG. 4, the application program 212-2 is not specifically authorized to connect to the VPN server 240 in any application rule 223. Accordingly, the application controller 220 blocks all communications from the application program 212-2 to the VPN server 240 (step 410).

As can be appreciated from the foregoing, embodiments of the present invention provide numerous advantages heretofore unrealized. First, embodiments of the present invention prevent computer worms from attacking a private computer network through a VPN connection. Second, because embodiments of the present invention are not limited to any particular VPN client software or protocol (and there are many), embodiments of the present invention may be readily deployed in many different new and pre-existing VPNs.

Methods and systems for preventing computer worms from attacking a private computer network through a VPN connection have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
 detecting a virtual private network (VPN) interface in a client computer;
 detecting a first application program running in the client computer and attempting to connect to a VPN server of a private computer network using the VPN interface;
 consulting an application rule in the client computer to determine if the first application program is authorized to connect to the VPN server using the VPN interface;
 allowing the first application program to connect to the private computer network through a VPN connection provided by the VPN server over the Internet when the application rule indicates that the first application program is authorized to connect to the VPN server;
 detecting a second application program running in the client computer and attempting to connect to the VPN server of the private computer network using the VPN interface;
 consulting the application rule to determine if the second application program is authorized to connect to the VPN server using the VPN interface; and
 blocking the second application program from connecting to the VPN server when the application rule does not specifically indicate that the second application program is authorized to connect to the VPN server.

2. The method of claim 1, wherein the private computer network comprises a local area network (LAN).

3. The method of claim 1, further comprising:
 prior to the first application program attempting to connect to the VPN server of the private computer network using the VPN interface, downloading the application rule from the VPN server to the client computer.

4. The method of claim 1, further comprising:
 disabling default route adding for the VPN interface.

5. The method of claim 1, wherein the application rule is manually entered by a user of the client computer.

6. The method of claim 1, wherein the client computer connects to the VPN server over the Internet by way of a publicly accessible hotspot.

7. The method of claim 1, further comprising:
 detecting a plurality of VPN interfaces in the client computer, the VPN interface being among the plurality of VPN interfaces; and
 disabling default route adding for the plurality of VPN interfaces.

8. The method of claim 1, further comprising:
   detecting a plurality of VPN interfaces in the client computer, the VPN interface being among the plurality of VPN interfaces; and
   for each VPN interface in the plurality of the VPN interfaces, receiving a corresponding application rule from a corresponding VPN server.

9. A system comprising:
   a virtual private network (VPN) server of a private computer network; and
   a client computer that detects a VPN interface in a client computer, detects a first application program running in the client computer and attempting to connect to the VPN server of the private computer network using the VPN interface, consults an application rule in the client computer to determine if the first application program is authorized to connect to the VPN server using the VPN interface, allows the first application program to connect to the private computer network through a VPN connection provided by the VPN server over the Internet when the application rule indicates that the first application program is authorized to connect to the VPN server, detects a second application program running in the client computer and attempting to connect to the VPN server of the private computer network using the VPN interface, consults the application rule to determine if the second application program is authorized to connect to the VPN server using the VPN interface, and blocks the second application program from connecting to the VPN server when the application rule does not specifically indicate that the second application program is authorized to connect to the VPN server.

10. The system of claim 9, wherein the client computer downloads the application rule from the VPN server to the client computer prior to the first application program attempting to connect to the VPN server of the private computer network using the VPN interface.

11. The system of claim 9, wherein the client computer provides a graphical user interface to receive the application rule from a user of the client computer.

12. The system of claim 9, wherein the client computer detects a plurality of VPN interfaces in the client computer and disables default route adding for the plurality of VPN interfaces.

13. The system of claim 9, wherein the client computer detects a plurality of VPN interfaces in the client computer and receives a corresponding application rule from a corresponding VPN server for each VPN interface in the plurality of the VPN interfaces.

* * * * *